(12) United States Patent
Agrawal et al.

(10) Patent No.: US 12,282,595 B2
(45) Date of Patent: Apr. 22, 2025

(54) MANAGING NOTIFICATIONS AMONG CONNECTED DEVICES

(71) Applicant: MOTOROLA MOBILITY LLC, Wilmington, DE (US)

(72) Inventors: Amit Kumar Agrawal, Bangalore (IN); Ganesh Pradeep P V, Bangalore (IN); Sinchana A P, Bangalore (IN)

(73) Assignee: Motorola Mobility LLC, Chicago, IL (US)

( * ) Notice: Subject to any disclaimer, the term of this patent is extended or adjusted under 35 U.S.C. 154(b) by 0 days.

(21) Appl. No.: 18/192,697

(22) Filed: Mar. 30, 2023

(65) Prior Publication Data

US 2024/0329732 A1 Oct. 3, 2024

(51) Int. Cl.
| | |
|---|---|
| G06F 3/01 | (2006.01) |
| G06F 3/0346 | (2013.01) |
| G06F 3/0488 | (2022.01) |
| G06F 3/14 | (2006.01) |
| G06T 7/70 | (2017.01) |

(52) U.S. Cl.
CPC ............ G06F 3/013 (2013.01); G06F 3/0346 (2013.01); G06F 3/0488 (2013.01); G06F 3/1423 (2013.01); G06T 7/70 (2017.01); *G06T 2207/30201* (2013.01)

(58) Field of Classification Search
CPC ...... G06F 3/0484; G06F 3/013; G06F 3/0346; G06F 3/1423; H04N 21/44218
See application file for complete search history.

(56) References Cited

U.S. PATENT DOCUMENTS

| | | | |
|---|---|---|---|
| 2014/0340334 A1* | 11/2014 | Cho | H04N 21/44218 345/173 |
| 2019/0087000 A1* | 3/2019 | Ricknäs | G06F 3/013 |
| 2019/0294239 A1* | 9/2019 | Suzuki | G02B 27/0093 |
| 2020/0249750 A1* | 8/2020 | Choi | G06F 3/04812 |
| 2021/0004081 A1* | 1/2021 | Sugihara | G06F 3/012 |
| 2022/0066725 A1* | 3/2022 | Xia | G06F 3/0488 |

* cited by examiner

*Primary Examiner* — Kevin M Nguyen
(74) *Attorney, Agent, or Firm* — Isidore PLLC

(57) ABSTRACT

An electronic device, method, and computer program product enable productivity of a combination desktop and mobile computing environments that are communicatively connected without distracting duplicative notifications on both a desktop and mobile user interface. A controller of the electronic device presents a first version of a user interface at an internal display of the electronic device and a second version at an external display of a second electronic device. The controller monitors input device(s) for an indication that user attention is directed to one of the internal display and the external display. The controller presents a notification via the first user interface at the internal display in response to determining that the user attention is directed to the internal display. The controller presents the notification via the second user interface at the external display in response to determining that the user attention is directed to the external display.

18 Claims, 6 Drawing Sheets

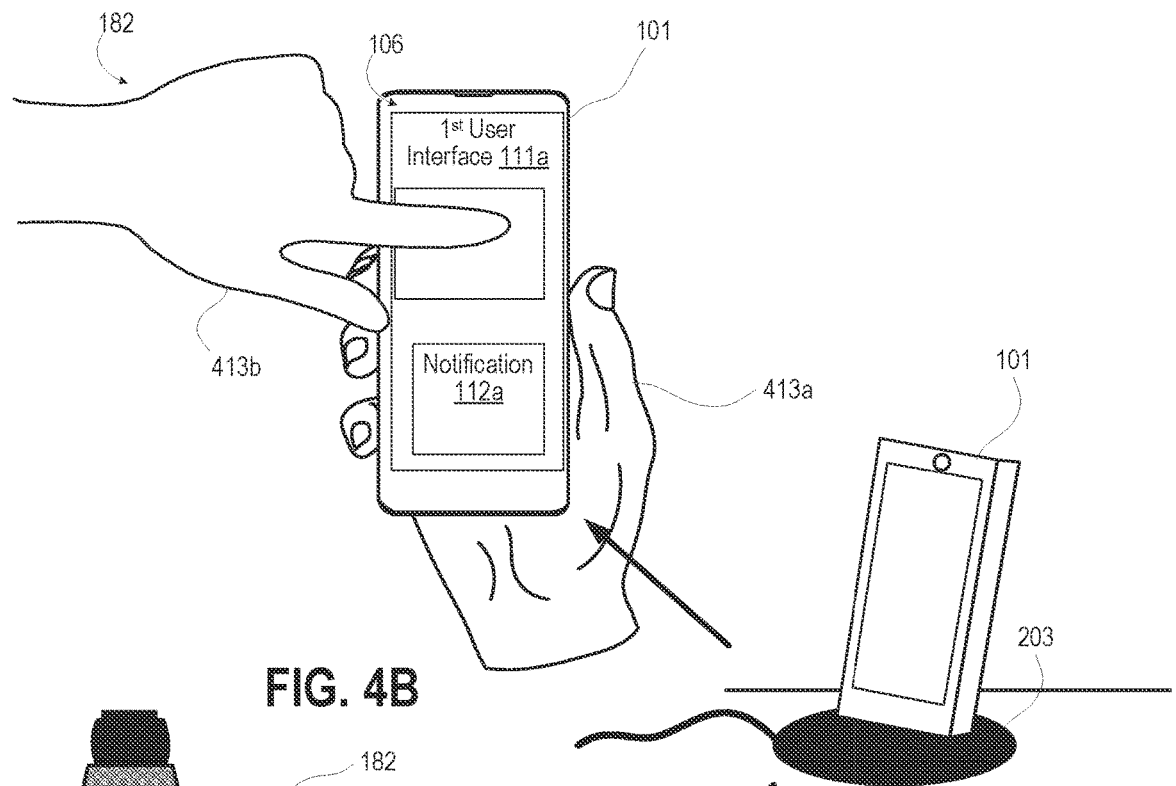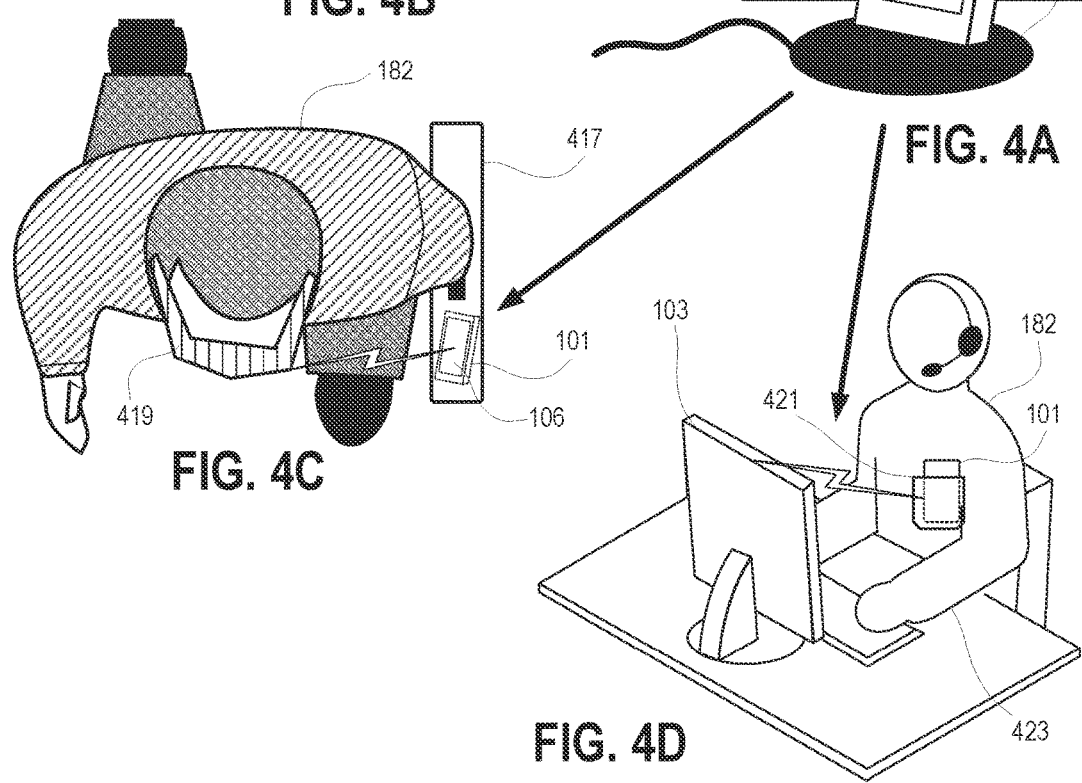

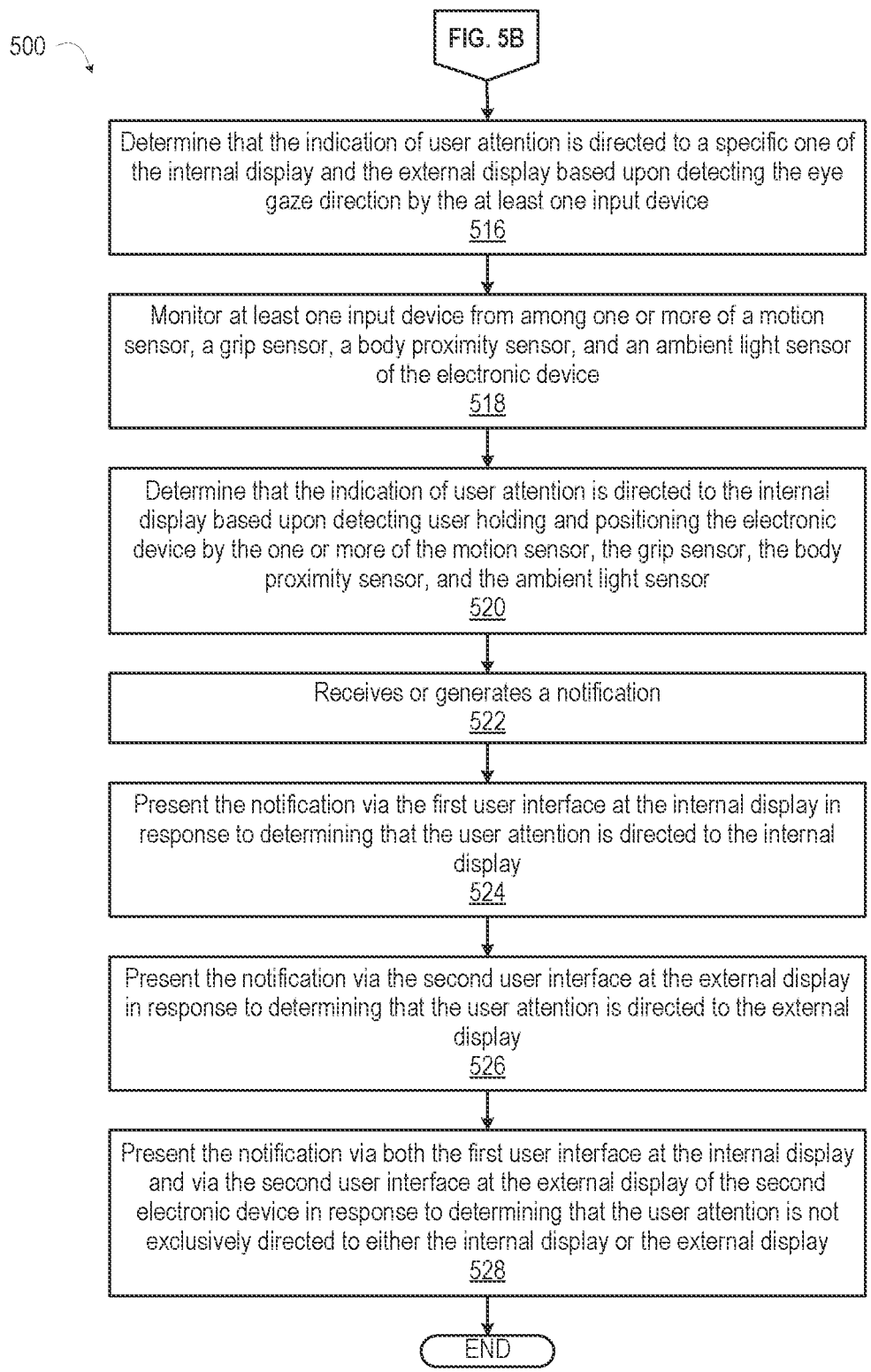

MANAGING NOTIFICATIONS AMONG CONNECTED DEVICES

BACKGROUND

1. Technical Field

The present disclosure relates generally to communication devices having a user interface device, and in particular to communication devices that can concurrently present a local user interface on an integral user interface device and an external user interface on an external display.

2. Description of the Related Art

User communication devices may be sized for mobility, enabling users to engage in audio as well as video communication sessions in nearly any location. Within a small handheld form factor, communication devices present sensors and output devices that can be used as a traditional phone handset with a speaker positioned to be used as an earpiece and a microphone positioned to capture audio inputs as spoken by a user. Some communication devices such as smartphones have become multi-functional devices as the designs have increasingly incorporated a large number of capabilities. In an example, rather than being limited to manually actuated control keys and buttons, a communication device can include a touch screen that is configurable to present both visual content and graphical controls in support of many types of applications, in addition to supporting user communication sessions.

When mobility is not required, the communication device may be used synergistically with a more traditional desktop laptop or workstation, taking advantage of larger displays and additional user input devices such as a full-size keyboard and computer mouse. The user may switch between using office productivity or entertainment applications resident on a desktop computer while continuing to at least intermittently use the communication device. So that a user has the full benefit of both the desktop computer and the communication device, user interfaces for certain capabilities may be duplicated so that the user receives time critical notifications regardless of whether giving attention to the desktop computer or the communication device. However, this flexibility also creates duplication in notifications that can unnecessarily distract a user to receive a duplicate notification that has already been reviewed on the other system or device.

BRIEF DESCRIPTION OF THE DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which:

FIG. 4A is a three-dimensional view of the communication device that is stationary and positioned in a dock, according to one or more embodiments;

FIG. 4B is a front view of the communication device being gripped by a right hand of a user and receiving touch inputs by a left hand of the user, according to one or more embodiments;

FIG. 4C is a top view of the communication device stowed in a briefcase and communicatively connected to an extended Reality display device, according to one or more embodiments;

FIG. 4D is a three-dimensional view of the communication device stowed in a pocket of a garment worn by the user who is interacting with a connected desktop system, according to one or more embodiments; and FIGS. 5A-5B (collectively "FIG. 5") are a flow diagram presenting a method of enabling productivity of a combination desktop and mobile computing environment without distracting duplicative notifications, according to one or more embodiments.

DETAILED DESCRIPTION

Figure 1:
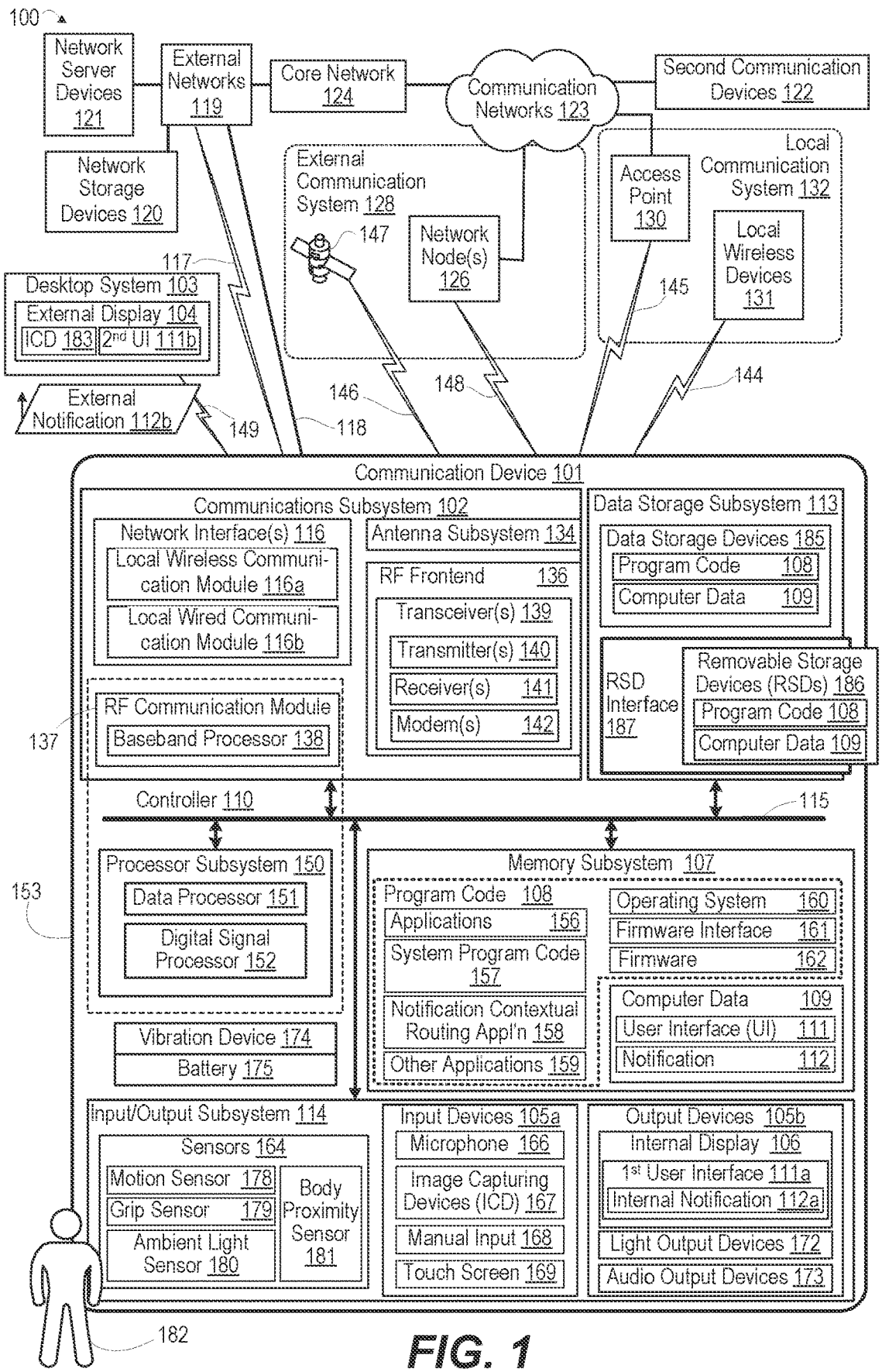
FIG. 1 depicts a functional block diagram of a communication environment including a communication device that supports streaming notifications to a connected second electronic device, according to one or more embodiments.

According to aspects of the present disclosure, an electronic device, a method, and a computer program product enable productivity of a combination desktop and mobile computing environments that are communicatively connected without distracting duplicative notifications on both a desktop and mobile user interface. The electronic device includes a communication interface that enables the electronic device to connect to a second electronic device having an external display. The electronic device includes an internal display and at least one input device. A controller of the electronic device is communicatively connected to the external display via the communication interface. The controller is connected to the internal display and the at least one input device. The controller presents at least one of a first version of the user interface including a first user interface at the internal display. The controller presents a second version of the user interface including a second user interface at the external display of the second electronic device. The controller monitors the at least one input device for an indication that user attention is directed to one of the internal display or the external display. The controller receives or generates the notification for presentation to the user. The controller presents the notification via the first user interface at the internal display in response to determining that the user attention is directed to the internal display. Alternatively, the controller presents the notification via the second user interface at the external display in response to determining that the user attention is directed to the external display.

Aspects of the present disclosure enhance an environment where user interface information is sent to multiple platforms accessible to a user when a connection between the platforms is active. The user can choose to respond to notifications, for example, from a desktop user interface or from a mobile user interface that are generated for an application or a system. Currently, notifications are sent to both user interfaces, enabling the user to choose which platform to respond from. As an example implementation, opening a notification may launch an application. Notification streaming to the external display may add value when the user is focused on the desktop computing platform and is not looking at the mobile communication device, even though the duplication in notification may be a source of annoyance to the user. Turning off dual notifications streaming for a given application without any contextual logic to avoid the annoyance could lead to the user not being notified about important information when a corresponding application is not active, not running, or minimized on the device display(s).

In particular, the present disclosure provides features for determining that the electronic device, such as a mobile communication device or smartphone, is communicatively connected to a second electronic device, such as a personal computer (PC) or a computer tablet. The connection is either wired or wirelessly in a peer-to-peer network. The electronic device determines whether a notification streaming feature is turned on to share notifications from the electronic device to the second electronic device. The electronic device may use sensor data to determine whether or not the electronic is being held or is being stowed on-body. Examples of sensors that provide sensor data include as touch sensors, accelerometers, motion sensors, electromagnetic impedance sensors, etc. Alternatively, or in addition, the electronic device may use image sensor data such as an always-on front camera to determine whether the user is actively looking at a device screen or not. Alternatively, or in addition, the electronic device may determine that the user is interacting with applications executed by the second electronic device. In an example, the controller determines a set of applications for which notification streaming is enabled, currently active, and running in foreground on the electronic device or having notification active on the second electronic device. The controller responds by routing notifications from the electronic device to the connected second electronic device based on determining that the user is either interacting with the second electronic device or based on determining that the user is not interacting with the electronic device. In an example, the controller may use sensor data to determine that the user is holding and using the electronic device, making notifications at the second electronic device redundant and unnecessary. Conversely, based on determining that the user is not holding the electronic device, the controller can determine the appropriate platform for presenting notifications based on other types of sensor data, such as the user actively using an input device of a particular one of the electronic devices or based on detecting eye gaze direction toward one of the electronic devices.

In an example operation, the present disclosure provides for communicatively connecting the electronic device to a second electronic device via a peer-to-peer network. The controller of the electronic device determines whether a notification streaming feature is turned on to share notifications from the electronic device to the second electronic device. The controller uses sensor data or application data to determine whether notifications to one of the electronic devices is redundant. In an example, the controller uses sensors of the electronic device to indicate whether the using (i) is gripping the electronic device, indicating attention to the electronic device, or (ii) has stowed the electronic device on-body, indicating inattention to the electronic device. In another example, the controller uses image data from one or more image capturing devices to detect whether or not the user is looking at displays of at least one of the electronic devices. In an additional example, the controller determines whether applications are active in the foreground on the second electronic device for which notification streaming is enabled from the electronic device. The controller stops routing notifications from the electronic device to the second electronic device when the user is currently interacting with the electronic device and not with the second electronic device.

In the following detailed description of exemplary embodiments of the disclosure, specific exemplary embodiments in which the various aspects of the disclosure may be practiced are described in sufficient detail to enable those skilled in the art to practice the invention, and it is to be understood that other embodiments may be utilized and that logical, architectural, programmatic, mechanical, electrical, and other changes may be made without departing from the spirit or scope of the present disclosure. The following detailed description is, therefore, not to be taken in a limiting sense, and the scope of the present disclosure is defined by the appended claims and equivalents thereof. Within the descriptions of the different views of the figures, similar elements are provided similar names and reference numerals as those of the previous figure(s). The specific numerals assigned to the elements are provided solely to aid in the description and are not meant to imply any limitations (structural or functional or otherwise) on the described embodiment. It will be appreciated that for simplicity and clarity of illustration, elements illustrated in the figures have not necessarily been drawn to scale. For example, the dimensions of some of the elements are exaggerated relative to other elements.

It is understood that the use of specific component, device and/or parameter names, such as those of the executing utility, logic, and/or firmware described herein, are for example only and not meant to imply any limitations on the described embodiments. The embodiments may thus be described with different nomenclature and/or terminology utilized to describe the components, devices, parameters, methods and/or functions herein, without limitation. References to any specific protocol or proprietary name in describing one or more elements, features or concepts of the embodiments are provided solely as examples of one implementation, and such references do not limit the extension of the claimed embodiments to embodiments in which different element, feature, protocol, or concept names are utilized. Thus, each term utilized herein is to be given its broadest interpretation given the context in which that term is utilized.

As further described below, implementation of the functional features of the disclosure described herein is provided within processing devices and/or structures and can involve use of a combination of hardware, firmware, as well as several software-level constructs (e.g., program code and/or program instructions and/or pseudo-code) that execute to provide a specific utility for the device or a specific functional logic. The presented figures illustrate both hardware components and software and/or logic components.

Those of ordinary skill in the art will appreciate that the hardware components and basic configurations depicted in the figures may vary. The illustrative components are not intended to be exhaustive, but rather are representative to highlight essential components that are utilized to implement aspects of the described embodiments. For example, other devices/components may be used in addition to or in place of the hardware and/or firmware depicted. The depicted example is not meant to imply architectural or other limitations with respect to the presently described embodiments and/or the general invention. The description of the illustrative embodiments can be read in conjunction with the accompanying figures. Embodiments incorporating teachings of the present disclosure are shown and described with respect to the figures presented herein.

FIG. 1 is a functional block diagram of a communication environment 100 that includes an electronic device, which is referenced herein as communication device 101 and in which the features of the present disclosure are advantageously implemented. In particular, communication device 101 includes a communication interface such as communications subsystem 102 that enables communication device 101 to connect to a second electronic device, such as desktop system 103 having external display 104. Communication device 101 has at least one input device 105a and at least one output device 105b, including internal display 106. Memory of communication device 101, such as memory subsystem 107, stores program code 108 that, when executed by controller 110, generates computer data 109 such as user interface 111. Controller 110 may generate a first version of user interface 111 as first user interface 111a for presenting on internal display 106. Controller 110 may generate a second version of user interface 111 as second user interface 111b for presenting on external display 104. Program code 108 selectively triggers generation of at least one notification 112 that is selectively routed respectively as internal and external notifications 112a-112b to one of first user interface 111a presented at internal display 106 and/or second user interface 111b presented at external display 104, based on context to avoid redundancy and user distraction.

Communication device 101 can be one of a host of different types of devices, including but not limited to, a mobile cellular phone, satellite phone, or smart phone, a laptop, a netbook, an ultra-book, a networked smartwatch or networked sports/exercise watch, and/or a tablet computing device or similar device that can include wireless communication functionality. As a device supporting wireless communication, communication device 101 can be utilized as, and also be referred to as, a system, device, subscriber unit, subscriber station, mobile station (MS), mobile, mobile device, remote station, remote terminal, user terminal, terminal, user agent, user device, a Session Initiation Protocol (SIP) phone, a wireless local loop (WLL) station, a personal digital assistant (PDA), computer workstation, a handheld device having wireless connection capability, a computing device, or other processing devices connected to a wireless modem.

Referring now to the specific component makeup and the associated functionality of the presented components. In addition to communications subsystem 102, memory subsystem 107, and controller 110, communication device 101 includes data storage subsystem 113, and input/output (I/O) subsystem 114 having input devices 105a and output devices 105b. To enable management by controller 110, system interlink 115 communicatively connects controller 110 with communications subsystem 102, memory subsystem 107, data storage subsystem 113, and I/O subsystem 114. System interlink 115 represents internal components that facilitate internal communication by way of one or more shared or dedicated internal communication links, such as internal serial or parallel buses. As utilized herein, the term "communicatively coupled" means that information signals are transmissible through various interconnections, including wired and/or wireless links, between the components. The interconnections between the components can be direct interconnections that include conductive transmission media or may be indirect interconnections that include one or more intermediate electrical components. Although certain direct interconnections (i.e., system interlink 115) are illustrated in FIG. 1, it is to be understood that more, fewer, or different interconnections may be present in other embodiments.

In one or more embodiments, communications subsystem 102 may include one or more network interfaces 116, such as local wireless communication module 116a and local wired communication module 116b, to communicatively couple communication device 101 via network cable 117 or wireless connection 118 to external networks 119. Communication device 101, via external networks 119, may connect to network storage devices 120 that store computer data and to network server devices 121 that facilitate access to network storage devices 120. Network server devices 121 may have identical or similar components and functionality as described above for communication device 101. Communication device 101 may communicate with second communication devices 122 via external networks 119 or via communication networks 123 that are supported by core networks 124. Network interface(s) 116 may include a network interface controller (NIC) and support one or more network communication protocols. External networks 119 can include a local area network (LAN), a campus area network (CAN), a metropolitan area network (MAN), or a wide area network (WAN). For example, network cable 117 can be an Ethernet cable.

In one or more embodiments, communications subsystem 102 may include additional functionality for communicating, using a cellular connection, with network node(s) 126 of external communication system 128 and for communicating, using a wireless connection, with wireless access point 130 or local wireless devices 131 of local communication system 132. Communications subsystem 102 includes antenna subsystem 134. Communications subsystem 102 includes radio frequency (RF) front end 136 and RF communication module 137 having baseband processor 138. RF front end 136 includes transceiver(s) 139, which includes transmitter(s) 140 and receiver(s) 141. RF front end 136 further includes modem(s) 142. Baseband processor 138 of RF communication module 137 communicates with controller 110 and RF front end 136. Baseband processor 138 operates in a baseband frequency range to encode data for transmission and decode received data, according to a communication protocol. Modem(s) 142 modulates baseband encoded data from RF communication module 137 onto a carrier signal to provide a transmit signal that is amplified by transmitter(s) 140. Modem(s) 142 demodulates each signal received using antenna subsystem 134 from external communication system 128 or local communication system 132. The received signal is amplified and filtered by receiver(s) 141, which demodulates received encoded data from a received carrier signal.

In one or more embodiments, controller 110, via communications subsystem 102, performs multiple types of cellular over-the-air (OTA) or wireless communication with local communication system 132. Communications subsystem 102 can communicate via an OTA connection 144 with local wireless devices 131. In an example, OTA connection 144 is a Bluetooth connection, or other personal access network (PAN) connection. In one or more embodiments, communications subsystem 102 communicates with one or more locally networked devices via a wireless local area network (WLAN) link 145 supported by access point 130. In one or more embodiments, access point 130 supports communication using one or more IEEE 802.11 WLAN protocols. Access point 130 is connected to communication networks 123 via a cellular or wired connection. In one or more embodiments, communications subsystem 102 receives downlink channels 146 from GPS satellites 147 to obtain geospatial location information. Communications subsystem 102 can communicate via an over-the-air (OTA) cellular connection 148 with network node(s) 126. Communication device 101 communicatively connects to desktop system 103 via connection 149, which may include any of the previously mentioned wired, wireless, or RF connections or channels including other electromagnetic bands.

Controller 110 includes processor subsystem 150, which includes one or more central processing units (CPUs), depicted as data processor 151. Processor subsystem 150 can include one or more digital signal processors 152 that can be integrated with data processor 151. Processor subsystem 150 can include other processors that are communicatively coupled to data processor 151, such as baseband processors 138 of communication module 137. In one or more embodiments that are not depicted, controller 110 can further include distributed processing and control components that are external to housing 153 or grouped with other components, such as I/O subsystem 114. Data processor 151 is communicatively coupled, via system interlink 116, to memory subsystem 107. In one or more embodiments, data processor 151 is communicatively coupled via system interlink 115 to communications subsystem 102, data storage subsystem 113 and I/O subsystem 114. Controller 110 manages, and in some instances directly controls, the various functions and/or operations of communication device 101. These functions and/or operations include, but are not limited to including, application data processing, communication with second communication devices, navigation tasks, image processing, and signal processing. In one or more alternate embodiments, communication device 101 may use hardware component equivalents for application data processing and signal processing. For example, communication device 101 may use special purpose hardware, dedicated processors, general purpose computers, microprocessor-based computers, micro-controllers, optical computers, analog computers, dedicated processors and/or dedicated hard-wired logic.

Memory subsystem 107 stores program code 108 for execution by processor subsystem 150 to provide the functionality described herein. Program code 108 includes applications such as applications 156 and system program code 157 that generates notifications 112. Program code 108 includes notification contextual routing application 158 that, when executed, selectively routes notifications 112 as internal and external notifications 112a and 112b. Program code 108 includes other applications 159. In one or more embodiments, several of the described aspects of the present disclosure are provided via executable program code of applications executed by controller 110. Program code 108 may access, use, generate, modify, store, or communicate computer data 109. Computer data 109 may incorporate "data" that originated as raw, real-world "analog" information that consists of basic facts and figures. Computer data 109 includes different forms of data, such as numerical data, images, coding, notes, and financial data. The computer data may originate at communication device 101 or be retrieved by communication device 101. Communication device 101 may store, modify, present, or transmit computer data 109. Computer data may be organized in one of a number of different data structures. Common examples of computer data 109 include video, graphics, text, and images as discussed herein. Computer data 109 can also be in other forms of flat files, databases, and other data structures.

In one or more embodiments, program code 108 may be integrated into a distinct chipset or hardware module as firmware that operates separately from executable program code. Portions of program code 108 may be incorporated into different hardware components that operate in a distributed or collaborative manner. Implementation of program code 108 may use any known mechanism or process for doing so using integrated hardware and/or software, as known by those skilled in the art. Memory subsystem 107 further includes operating system (OS) 160, firmware interface 161, such as basic input/output system (BIOS) or Uniform Extensible Firmware Interface (UEFI), and firmware 162, which may be considered to be program code 108.

I/O subsystem 114 includes input devices 105a, output devices 105b, and sensors 164. Input devices 105a may include microphone 166, image capturing devices 167, manual input devices 168 (e.g., keys and buttons), and touch screen 169. In addition to internal display 106, output devices 105b may include light output devices 172, audio output devices 173, and vibration device 174 that oscillates a mass, such as battery 175, to create vibratory alerts. Internal display 106 may include touch screen 169 to operate as a touch screen display. Sensors 164 provides additional contextual indications of the use and environment of communication device 101. Examples of sensors 164 include motion sensors or motion detectors 178 such as accelerometers, grip sensors 179 exteriorly presented on housing 153, ambient light sensor 180, and on-body or body proximity sensor 181 that electromagnetically detects proximity to a lossy dielectric mass (i.e., body or hand of user 182). Controller 110 may also receive inputs or sensor data from other devices that indicate context. In an example, desktop system 103 includes image capturing device (ICD) 183 having a field of view to capture a user in front of external display 104.

Data storage subsystem 113 of communication device 101 includes data storage device(s) 185. Controller 110 is communicatively connected, via system interlink 115, to data storage device(s) 185. Data storage subsystem 113 provides program code 108 and computer data 109 stored on non-volatile storage that is accessible by controller 110. For example, data storage subsystem 113 can provide a selection of computer data 109 and applications 156. These applications can be loaded into memory subsystem 107 for execution/processing by controller 110. In one or more embodiments, data storage device(s) 185 can include hard disk drives (HDDs), optical disk drives, and/or solid-state drives (SSDs), etc. Data storage subsystem 113 of communication device 101 can include removable storage device(s) (RSD(s)) 186, which is received in RSD interface 187. Controller 110 is communicatively connected to RSD 186, via system interlink 115 and RSD interface 187. In one or more embodiments, RSD 186 is a non-transitory computer program product or computer readable storage device. Controller 110 can access data storage device(s) 185 or RSD 186 to provision communication device 101 with program code, such as program code 108.

Figure 2:
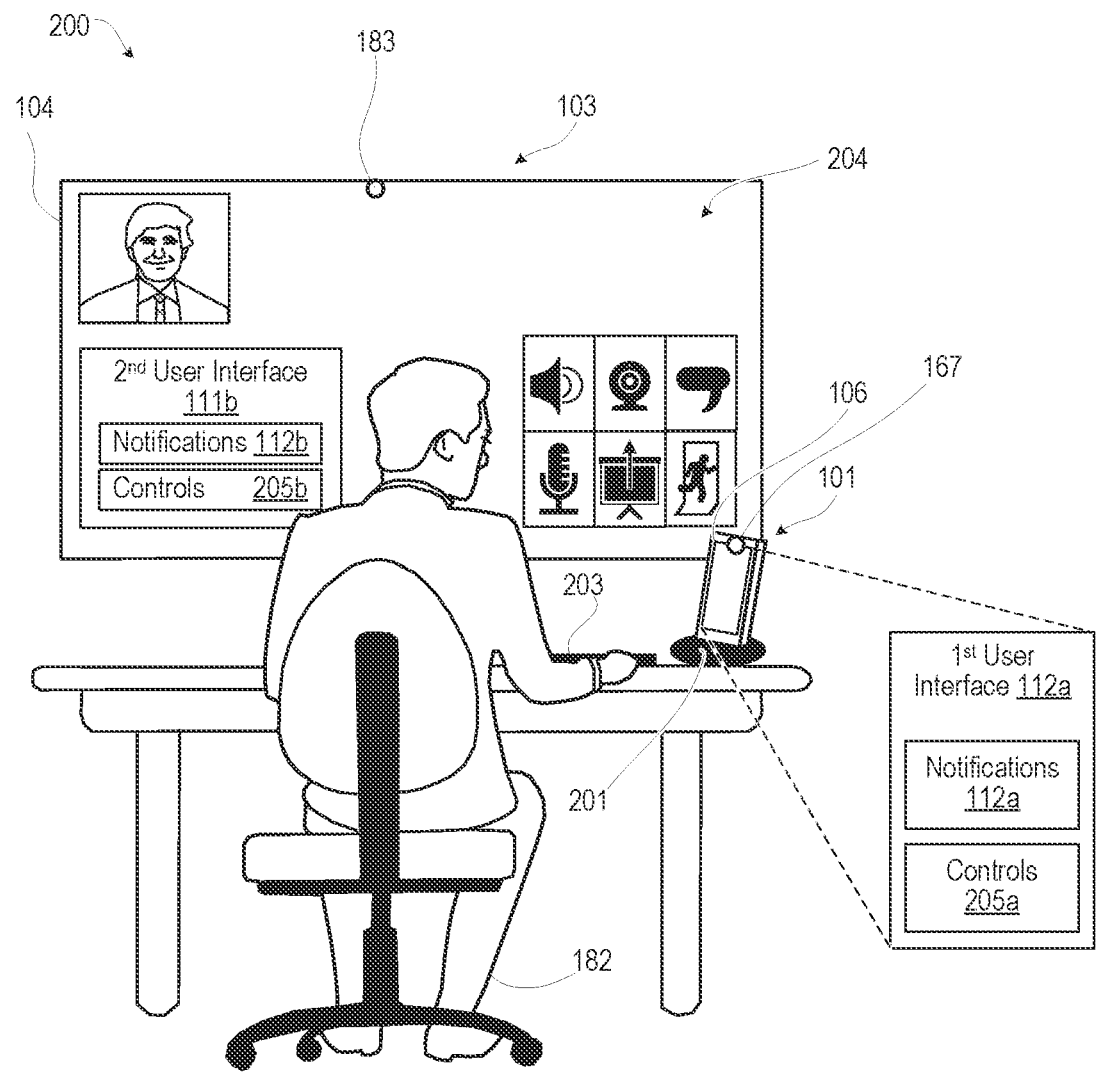
FIG. 2 is a front view of an example combination desktop and mobile computing environment provided by the communication device of FIG. 1 being communicatively connected to a desktop system, according to one or more embodiments.

FIG. 2 is combination desktop and mobile computing environment 200 provided by communication device 101 communicatively connected to desktop system 103 of FIG. 1. Communication device 101 is positioned in dock 201 (thus stationary) and is not being held or carried by user 182. User 182 is interacting with an input device, such as a keypad 203, of desktop system 103 to control application 204, such as video communication session. At least momentarily, user 182 is looking at internal display 106 of communication device 101 rather than external display 104 of desktop system 103. Communication device 101 may detect a gaze direction of user 182 based on images provided by image capturing devices 167 and 183 respectively of communication device 101 and desktop system 103. Communication device 101 may determine that a divided attention context is presented with user 182 not giving attention predominantly to either communication device 101 or desktop system 103. In response, communication device 101 may stream internal notifications 112a at first user interface 111a presented on internal display 106 of communication device 101. Communication device 101 may also concurrently stream external notifications 112b at second user interface 111b presented on external display 104 of desktop system 103. User 182 may respond to either internal or external notifications 112a-112b respectively by selecting controls 205a-205b of first and second user interfaces 111a-111b.

Figure 3A:
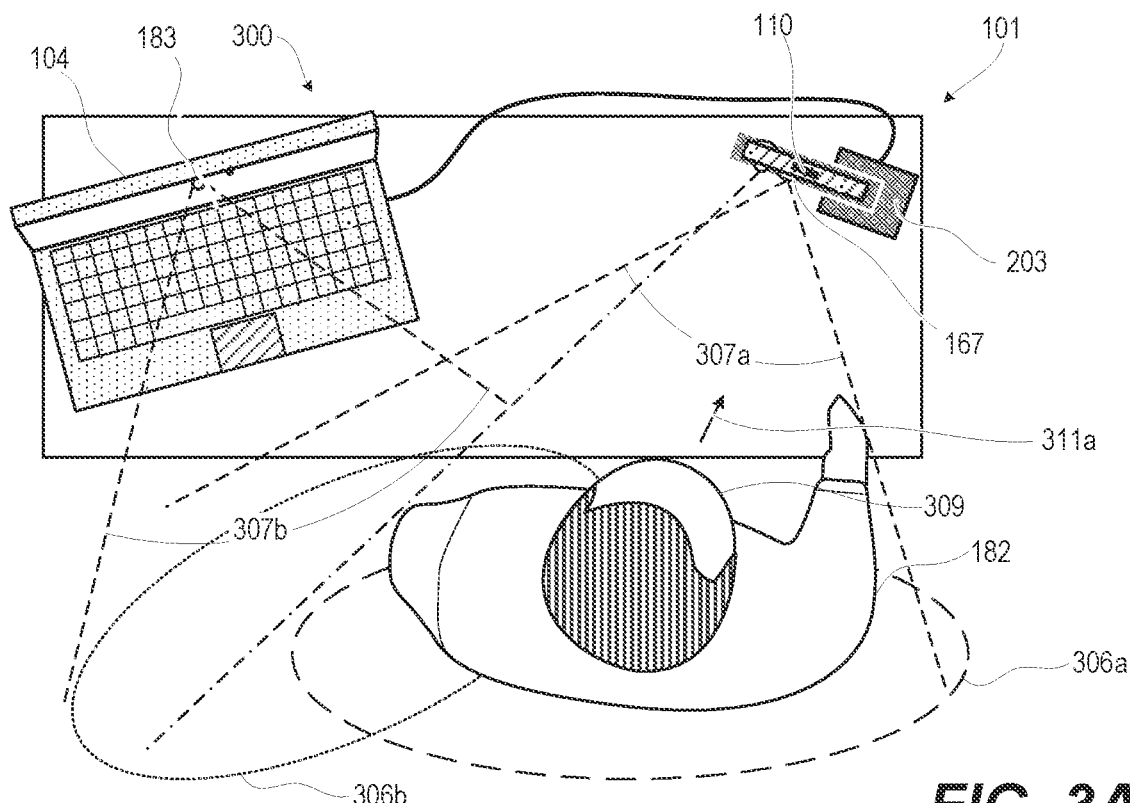
FIG. 3A is a top view the combination desktop and mobile computing environment with the user gazing toward the communication device, according to one or more embodiments.

FIG. 3A is combination desktop and mobile computing environment 300 provided by communication device 101 communicatively connected to desktop system 103, which is depicted as a laptop. Communication device 101 is stationary, positioned in dock 201 and not being held or carried by user 182. User 182 is not physically interacting with either communication device 101 or desktop system 103. With no physical contact with either communication device 101 or desktop system 103, controller 110 determines user 182 is paying attention to a particular display when the eye gaze direction is toward the particular display and is inattentive to a particular display that the eye gaze direction is away from the particular display. The controller 110 may be unable to determine eye gaze direction when user 182 is not in front of a particular display. The controller 110 may then determine that user 182 is inattentive to a particular display when not in front of the particular display. User is in first space 306a within first field of view (FOV) 307a of image capturing devices 167 of communication device 101. Controller 110 of communication device 101 may perform facial recognition to identify that face 309 is in front of internal display 106 with eye gaze direction 311a toward image capturing device 167 and internal display 106. Alternatively. or in addition, user 182 is in second space 306b within second FOV 307b of image capturing devices 183 of desktop system 103. Controller 110 may receive an image stream from image capturing devices 183 of desktop system 103. Controller 110 may perform facial recognition to identify that face 309 is in front of external display 104 with eye gaze direction 311a away from external display 104. In an additional example, face 309 may be sufficiently outside of second space 306b to not be recognized. Based on eye gaze direction 311a, controller 110 may identify that user 182 is giving attention to communication device 101 and selectively route notifications 112a to first user interface 111a (FIG. 2) of communication device 101 and not route notifications 112b to second user interface 111b (FIG. 2) of desktop system 103.

Figure 3B:
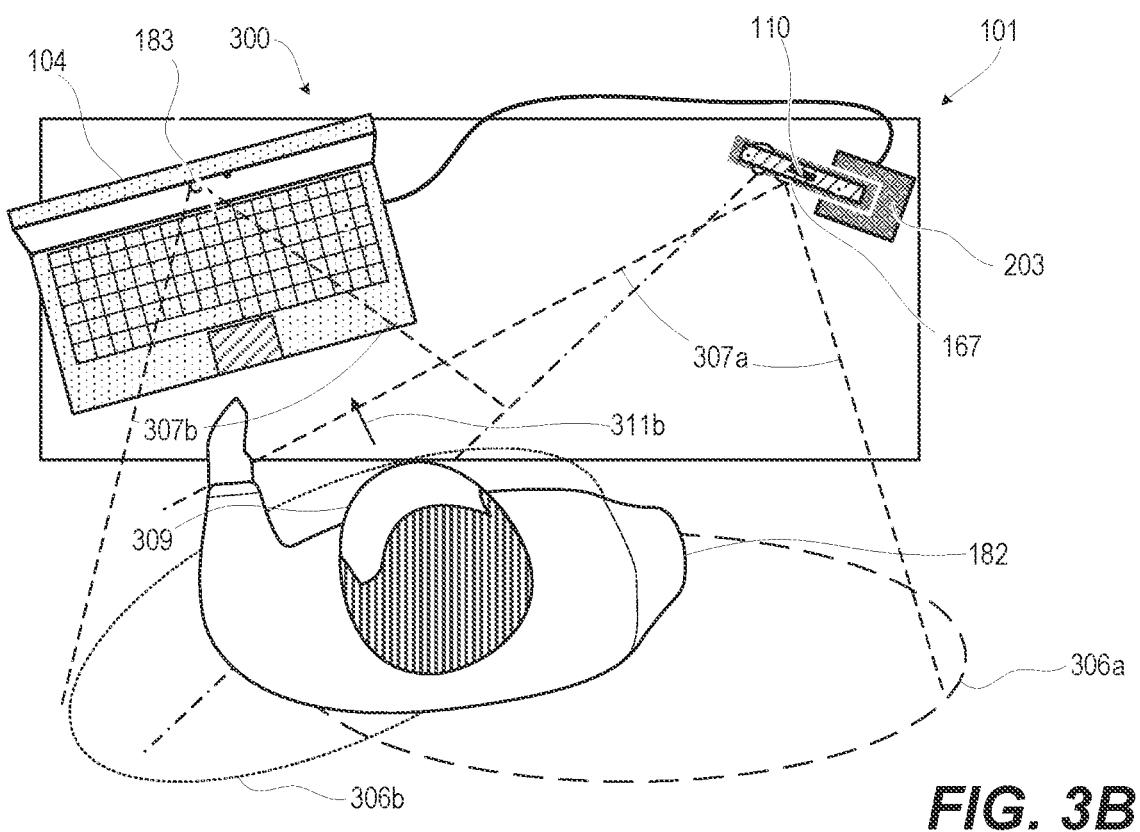
FIG. 3B is a top view the combination desktop and mobile computing environment with the user gazing toward the desktop system, according to one or more embodiments.

FIG. 3B is combination desktop and mobile computing environment 300 provided by communication device 101 communicatively connected to desktop system 103, depicted a laptop. Communication device 101 is stationary, positioned in dock 201 and not being held or carried by user 182. User 182 is not physically interacting with either communication device 101 or desktop system 103. User is in first space 306a within first FOV 307a of image capturing devices 167 of communication device 101. Controller 110 of communication device 101 may perform facial recognition to identify that face 309 is in front of internal display 106 with eye gaze direction 311b away from internal display 106. In another example, face 309 may be sufficiently outside of first space 306a to not be recognized. Alternatively. or in addition, user 182 is in second space 306b within second FOV 307b of image capturing devices 183 of desktop system 103. Controller 110 may receive an image stream from image capturing devices 183 of desktop system 103. Controller 110 may perform facial recognition to identify that face 309 is in front of external display 104 with eye gaze direction 311b related to image capturing device 183 toward external display 104. Based on eye gaze direction 311b, controller 110 may identify that user 182 is giving attention to desktop system 103 and selectively route notifications 112b to second user interface 111b (FIG. 2) of desktop system 103 and not route notifications 112b to first user interface 111a (FIG. 2) of communication device 101.

FIG. 4A is a three-dimensional view of communication device 101 positioned in stationary dock 201 and not being held or carried. Communication device 101 does not have context data based on physical interaction with user 182 (FIG. 1). Contextual data means that physical interaction by user 182 (FIG. 1) provides an indication of attention being given to communication device 101, and thus internal display 106. FIG. 4B is a front view of communication device 101 being gripped by right hand 413a of user 182 and receiving touch inputs to internal display 106 by left hand 413b of user 182. Communication device 101 identifies the context of user attention being given to communication device 101 and not to a connected second electronic device. In response, notification 112a is streamed to first user interface 111a.

FIG. 4C is a top view of communication device 101 stowed in briefcase 417 that is being carried by user 182 who is paying attention to second electronic device, depicted as e Xtended Reality (XR) display device 419. Communication device 101 can identify that communication device 101 is not being held and is not receiving ambient light. Although moving, communication device 101 can receive information from XR display device 419 indicating that user 182 is paying attention to XR display device 419. In response to the context, communication device 101 may stream second notifications 112b (FIG. 2) to XR display device 419 and not route first notifications 112a (FIG. 2) to internal display 106 of communication device 101.

Figure 5A:
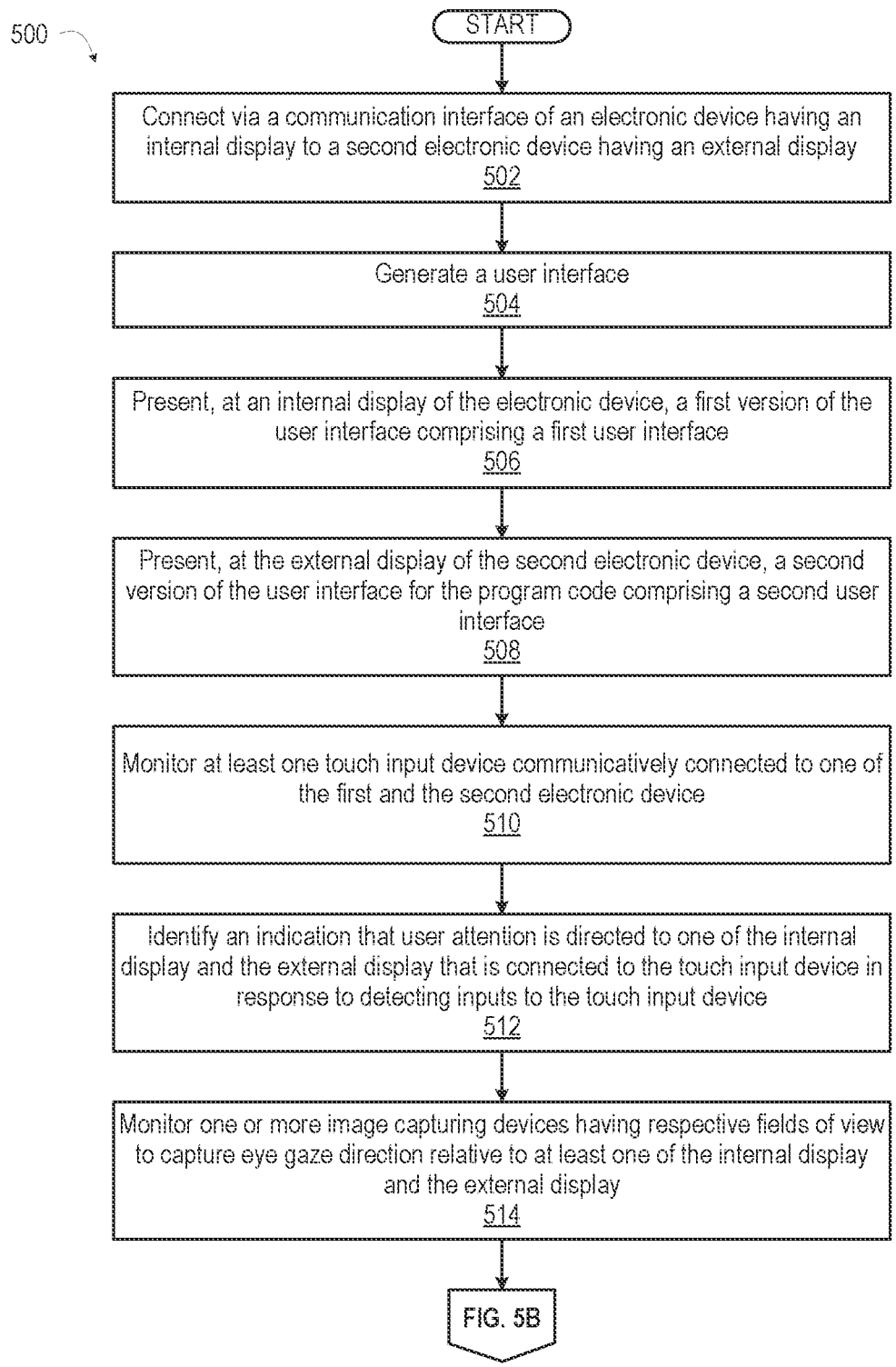

FIG. 4D is a three-dimensional view of communication device 101 stowed in pocket 421 of garment 423 worn by user 182. Communication device 101 may require confirmation that body proximity detection is an indication of communication device 101 being held and viewed. In an example, communication device 101 may identify the context of attention of user 182 to the external display based on one or more of: (i) control interactions with desktop system 103 that is wirelessly connected to communication device 101; (ii) user inputs to keyboard 203 of desktop system 103; (iii) lack of user inputs to communication device 101; (iv) facial recognition by image capturing device 183 (FIG. 1) of desktop system 103; and (v) lack of facial recognition from image capturing device 167 (FIG. 1) of communication device 101;

FIGS. 5A-5B (collectively "FIG. 5") are a flow diagram presenting method 500 of enabling productivity of a combination desktop and mobile computing environment without distracting duplicative notifications on both a desktop and mobile user interface. The description of method 500 (FIG. 5) is provided with general reference to the specific components illustrated within the preceding FIGS. 1, 2, 3A, 3B, and 4A-4C. Specific components referenced in method 500 (FIG. 5) may be identical or similar to components of the same name used in describing preceding FIGS. 1, 2, 3A, 3B, 4A-4D. In one or more embodiments, controller 110 (FIG. 1) configures communication device 101 (FIGS. 1, 2, 3A, 3B, and 4A-4D) to provide the described functionality of method 500 (FIG. 5).

With reference to FIG. 5A, method 500 includes connecting via a communication interface of an electronic device having an internal display to a second electronic device having an external display (block 502). Method 500 includes generating a user interface (block 504). In one or more embodiments, method 500 includes presenting, at an internal display of the electronic device, a first version of the user interface comprising a first user interface (block 506). Alternatively, or in addition, method 500 includes presenting, at the external display of the second electronic device, a second version of the user interface comprising a second user interface (block 508). Method 500 includes monitoring at least one touch input device communicatively connected to one of the first and the second electronic device (block 510). Method 500 includes identifying an indication that user attention is directed to one of the internal display and the external display that is connected to the touch input device in response to detecting inputs to the touch input device (block 512). Method 500 includes monitoring one or more image capturing devices having respective fields of view to capture eye gaze direction relative to at least one of the internal display and the external display (block 514). Method 500 proceeds to block 516 (FIG. 5B).

With reference to FIG. 5B, method 500 includes determining that the indication of user attention is directed to a specific one of the internal display and the external display based upon detecting the eye gaze direction by the at least one input device (block 516). Method 500 includes monitoring at least one input device from among one or more of a motion sensor, a grip sensor, a body proximity sensor, and an ambient light sensor of the electronic device (block 518). Method 500 includes determining that the indication of user attention is directed to the internal display based upon detecting user holding and positioning the electronic device by the one or more of the motion sensor, the grip sensor, the body proximity sensor, and the ambient light sensor (block 520). Method 500 includes receiving or generating a notification (block 522). Method 500 includes presenting the notification via the first user interface at the internal display in response to determining that the user attention is directed to the internal display (block 524). Method 500 includes presenting the notification via the second user interface at the external display in response to determining that the user attention is directed to the external display (block 526). Method 500 includes presenting the notification via both the first user interface at the internal display and via the second user interface at the external display of the second electronic device in response to determining that the user attention is not exclusively directed to either the internal display or the external display (block 528).

In one or more embodiments, in response to receiving the notification generated by the program code, method 500 may further include presenting the notification via the second user interface further based on determining at least one of: (i) an application is active on the second electronic device for which notification streaming from the electronic device is enabled and is being presented in a foreground of a display output presented at the external display; and (ii) a second user interface for notifications from the electronic device is active on the second electronic device.

Aspects of the present innovation are described above with reference to flowchart illustrations and/or block diagrams of methods, apparatus (systems) and computer program products according to embodiments of the innovation. It will be understood that each block of the flowchart illustrations and/or block diagrams, and combinations of blocks in the flowchart illustrations and/or block diagrams, can be implemented by computer program instructions. These computer program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

As will be appreciated by one skilled in the art, embodiments of the present innovation may be embodied as a system, device, and/or method. Accordingly, embodiments of the present innovation may take the form of an entirely hardware embodiment or an embodiment combining software and hardware embodiments that may all generally be referred to herein as a "circuit," "module" or "system."

While the innovation has been described with reference to exemplary embodiments, it will be understood by those skilled in the art that various changes may be made, and equivalents may be substituted for elements thereof without departing from the scope of the innovation. In addition, many modifications may be made to adapt a particular system, device, or component thereof to the teachings of the innovation without departing from the essential scope thereof. Therefore, it is intended that the innovation not be limited to the particular embodiments disclosed for carrying out this innovation, but that the innovation will include all embodiments falling within the scope of the appended claims. Moreover, the use of the terms first, second, etc. do not denote any order or importance, but rather the terms first, second, etc. are used to distinguish one element from another.

The terminology used herein is for the purpose of describing particular embodiments only and is not intended to be limiting of the innovation. As used herein, the singular forms "a", "an" and "the" are intended to include the plural forms as well, unless the context clearly indicates otherwise. It will be further understood that the terms "comprise" and/or "comprising." when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present innovation has been presented for purposes of illustration and description but is not intended to be exhaustive or limited to the innovation in the form disclosed. Many modifications and variations will be apparent to those of ordinary skill in the art without departing from the scope and spirit of the innovation. The embodiments were chosen and described in order to best explain the principles of the innovation and the practical application, and to enable others of ordinary skill in the art to understand the innovation for various embodiments with various modifications as are suited to the particular use contemplated.

What is claimed is:

1. An electronic device comprising:
a communication interface that enables the electronic device to connect to a second electronic device having an external display;
an internal display;
at least one input device; and
a controller communicatively connected to the external display via the communication interface, and to the internal display and the at least one input device, and which:
presents at least one of a first version of a user interface comprising a first user interface at the internal display and a second version of the user interface comprising a second user interface at the external display of the second electronic device;
monitors inputs from at least one input device or sensor for an indication that user attention is exclusively directed to one of the internal display or the external display;
receives or generates a notification to be presented on at least one of the internal display and the external display;
in response to determining that the user attention is directed to the internal display, selectively routes the notification to and presents the notification via the first user interface at only the internal display; and
in response to determining that the user attention is directed to the external display, selectively routes the notification to and presents the notification via the second user interface at only the external display of the second electronic device; and
in response to determining that the user attention is not exclusively directed to either the internal display or the external display, concurrently presents the notification via both the first user interface at the internal display and via the second user interface at the external display of the second electronic device.

2. The electronic device of claim 1, wherein the controller:
in response to receiving or generating the notification, presents the notification via the second user interface further based on determining at least one of: (i) an application is active on the second electronic device for which notification streaming from the electronic device is enabled and is being presented in a foreground of a display output presented at the external display; and
(ii) a second user interface for notifications from the electronic device is active on the second electronic device.

3. The electronic device of claim 1, wherein:
the at least one input device comprises a first image capturing device having a first field of view of a first space in front of the internal display and configured to detect eye gaze direction; and
the controller determines that the indication of user attention is directed to the internal display based upon the eye gaze direction.

4. The electronic device of claim 3, wherein:
the at least one input device comprises a second image capturing device, at the second electronic device, having a second field of view of a second space in front of the external display; and
the controller determines that the indication of user attention is directed to the external display based upon the eye gaze direction being towards the second image capturing device.

5. The electronic device of claim 1, wherein:
the at least one input device comprises a motion detector; and
the controller determines that the indication of user attention is directed to the internal display based upon motion of the electronic device detected by the motion detector.

6. The electronic device of claim 1, wherein:
the at least one input device comprises one or more of a body proximity sensor and an ambient light sensor; and
the controller determines that the indication of user attention is directed to the external display based upon the at least one input device indicating that the electronic device is stowed.

7. The electronic device of claim 1, wherein:
the at least one input device comprises a grip sensor; and
the controller determines that the indication of user attention is directed to the internal display based upon the at least one input device indicating that the electronic device is being gripped.

8. A method comprising:
connecting via a communication interface of an electronic device to a second electronic device having an external display;
concurrently presenting at least one of a first version of a user interface comprising a first user interface at an internal display of the electronic device and a second version of the user interface comprising a second user interface at the external display of the second electronic device;
monitoring at least one input device or sensor for an indication that user attention is directed to one of the internal display and the external display;
receiving or generating a notification to be presented on at least one of the internal display and the external display;
in response to determining that the user attention is directed to the internal display, presenting the notification via the first user interface only at the internal display;
in response to determining that the user attention is directed to the external display presenting the notification via the second user interface only at the external display of the second electronic device; and
concurrently presenting the notification via both the first user interface at the internal display and via the second user interface at the external display of the second electronic device, in response to determining that the user attention is not exclusively directed to either the internal display or the external display.

9. The method of claim 8, wherein, in response to receiving or generating the notification, the method further comprises presenting the notification via the second user interface further based on determining at least one of: (i) an application is active on the second electronic device for which notification streaming from the electronic device is enabled and is being presented in a foreground of a display output presented at the external display; and (ii) a second user interface for notifications from the electronic device is active on the second electronic device.

10. The method of claim 8, wherein:
the at least one input device comprises a first image capturing device having a first field of view of a first space in front of the internal display and configured to detect eye gaze direction; and the method comprises determining that the indication of user attention is directed to the internal display based upon detecting the eye gaze direction by the at least one input device.

11. The method of claim 10, wherein:

the at least one input device comprises a second image capturing device, at the second electronic device, having a second field of view of a second space in front of the external display; and the method comprises determining that the indication of user attention is directed to the external display based upon detecting the eye gaze direction being towards the second image capturing device.

12. The method of claim 8, wherein:

the at least one input device comprises a motion detector; and the method comprises determining that the indication of user attention is directed to the internal display based upon detecting motion of the electronic device by the motion detector.

13. The method of claim 8, wherein:

the at least one input device comprises one or more of a body proximity sensor and an ambient light sensor; and the method comprises determining that the indication of user attention is directed to the external display based upon receiving an indication from the input device that the electronic device is stowed.

14. The method of claim 8, wherein:

the at least one input device comprises a grip sensor; and the method includes determining that the indication of user attention is directed to the internal display based upon detecting, by the grip sensor, that the electronic device is being gripped.

15. A computer program product comprising:

a non-transitory computer readable storage device; and program code on the computer readable storage device that when executed by a processor associated with an electronic device, the program code enables the electronic device to provide functionality of:

connecting via a communication interface of the electronic device to a second electronic device having an external display;

presenting at least one of a first version of a user interface comprising a first user interface at an internal display of the electronic device and a second version of the user interface comprising a second user interface at the external display of the second electronic device;

monitoring at least one input device or sensor for an indication that user attention is directed to one of the internal display and the external display;

receiving or generating a notification to be presented on at least one of the internal display and the external display;

in response to determining that the user attention is directed to the internal display, presenting the notification via the first user interface only at the internal display;

in response to determining that the user attention is directed to the external display, presenting the notification via the second user interface only at the external display; and concurrently presenting the notification via both the first user interface at the internal display and via the second user interface at the external display of the second electronic device, in response to determining that the user attention is not exclusively directed to either the internal display or the external display.

16. The computer program product of claim 15, wherein the program code enables the electronic device to provide functionality of:

monitoring the at least one input device comprising a touch input device communicatively connected to one of the first and the second electronic device; and identifying the indication that user attention is directed to one of the internal display and the external display that is connected to the touch input device in response to inputs to the touch input device.

17. The computer program product of claim 15, wherein the program code enables the electronic device to provide functionality of:

monitoring one or more image capturing devices having respective fields of view to capture eye gaze direction relative to at least one of the internal display and the external display; and determining that the indication of user attention is directed to one of the internal display and the external display based upon detecting the eye gaze direction by the at least one input device.

18. The computer program product of claim 15, wherein the program code enables the electronic device to provide functionality of:

monitoring one or more of a motion sensor, a grip sensor, a body proximity sensor, and an ambient light sensor of the electronic device; and determining that the indication of user attention is directed to the internal display based upon detecting user positioning the electronic device by the one or more of the motion sensor, the grip sensor, the body proximity sensor, and the ambient light sensor.

\* \* \* \* \*